(12) United States Patent
Suzuki

(10) Patent No.: US 6,688,358 B2
(45) Date of Patent: Feb. 10, 2004

(54) PNEUMATIC TIRE

(75) Inventor: Kazuya Suzuki, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/783,090

(22) Filed: Feb. 15, 2001

(65) Prior Publication Data
US 2001/0017178 A1 Aug. 30, 2001

(30) Foreign Application Priority Data
Feb. 15, 2000 (JP) .................................. 2000-036908

(51) Int. Cl.[7] .................... B60C 13/00; B60C 13/02
(52) U.S. Cl. .................... 152/523; 152/525; 152/539
(58) Field of Search .................... 152/523–525, 152/539

(56) References Cited

U.S. PATENT DOCUMENTS 1,458,629 A * 6/1923 Raymond .................... 152/523
3,253,634 A * 5/1966 Young .................... 152/523
3,452,799 A * 7/1969 Hindin .................... 152/523
4,936,365 A * 6/1990 Chrobak et al. .................... 152/452

FOREIGN PATENT DOCUMENTS

JP         60128006     *   7/1985
JP         5-294115     *  11/1993

* cited by examiner

Primary Examiner—Michael W. Ball
Assistant Examiner—Justin Fischer
(74) Attorney, Agent, or Firm—Birch, Stewart, Kolasch & Birch, LLP

(57) ABSTRACT

A pneumatic tire comprises a pair of sidewall portions each provided on the axially outer surface thereof with a side protector, the side protector comprising at least two concentric ribs and at least one circumferential groove defined therebetween, the circumferential groove composed of a series of deep parts and shallow parts which alternate in the tire circumferential direction.

17 Claims, 3 Drawing Sheets

PNEUMATIC TIRE

BACKGROUND OF THE INVENTION

The present invention relates to a pneumatic tire, more particularly to a sidewall structure capable of improving the durability of the tire under high speed running on dirt roads.

In pneumatic tires, when used on dirt roads at high speed, such as a rally, it is important to protect the tire sidewall from edged objects on the roads.

As a countermeasure therefore, as shown in FIG. 6, each sidewall portion (a) is provided with a plurality of axially protruding concentric ribs (b), wherein a part (c) between the adjacent ribs (b) is formed as constant-depth groove (hereinafter the "groove (c)"). Such a tire is disclosed in Japanese Patent No. 2613996.

If the bottom of the groove (c) is cut during running, the cut tends to easily grow due to the presence of the ribs because tensile stress in the tire radial direction concentrates at the groove bottom when the tire is deformed.

Such a cut may be avoided if the amount of axial protrusion of the ribs is increased. But, an increase in the tire weight, which is especially undesirable for a racing tire, is unavoidable.

On the other hand, if the rubber thickness at the groove bottom is increased, namely, the depth of the groove (c) is decreased, part (c) may be increased in its resistance to cut. In this case, however, in addition to an increase in the tire weight, an unfavorable result is liable to be caused whereby cracks occur in the groove bottom because the tensile stress f which concentrates on the groove bottom increases as the groove depth decreases. Further, the shock absorbing performance of the tire is deteriorated.

SUMMARY OF THE INVENTION

It is therefore, an object of the present invention to provide a pneumatic tire suitable for high speed running on dirt roads, in which the resistance to cuts is improved and the occurrence of cracks is effectively controlled without increasing the tire weight.

According to the present invention, a pneumatic tire comprises a pair of sidewall portions each provided on the axially outer surface thereof with a side protector, the side protector comprising at least two concentric ribs and at least one circumferential groove defined therebetween, wherein the circumferential groove is composed of a series of deep parts and shallow parts which alternate in the tire circumferential direction.

The shallow parts connect the adjacent ribs to each other to resist the motion that opens the groove. Even if the deep parts are cut, as the tensile stress in the deep parts are effectively reduced by the presence of the shallow parts, the growth of the cut can be prevented. If the shallow parts are cut, the growth of the cut can be prevented because such parts have a sufficient amount of rubber thickness.

BRIEF DESCRIPTION OF THE DRAWINGS

An embodiment of the present invention will now be described in detail in conjunction with the accompanying drawings, wherein.

DETAILED DESCRIPTION OF THE INVENTION

Figure 1:
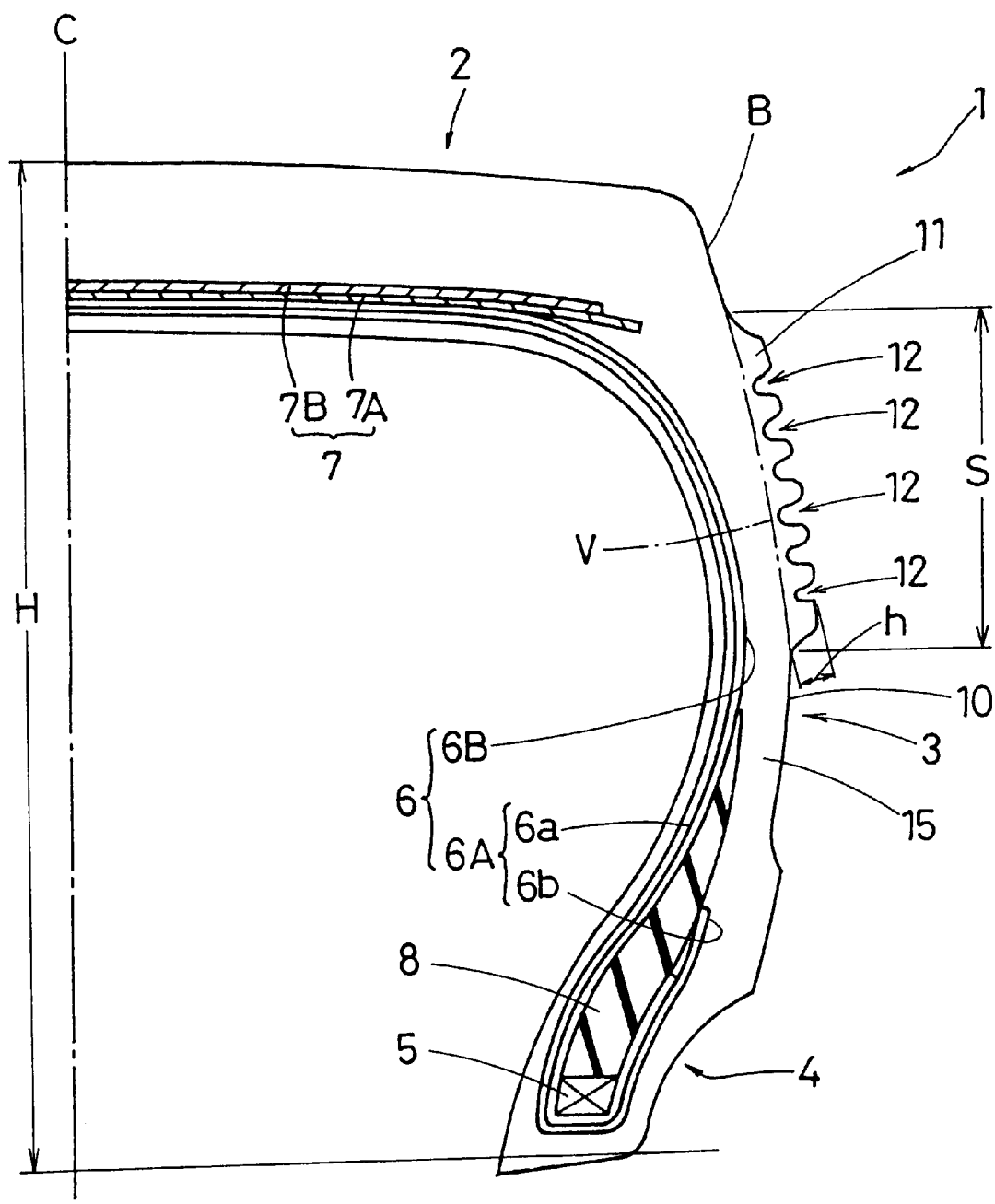
FIG. 1 is a cross section view of a pneumatic tire according to the present invention.
Figure 2:
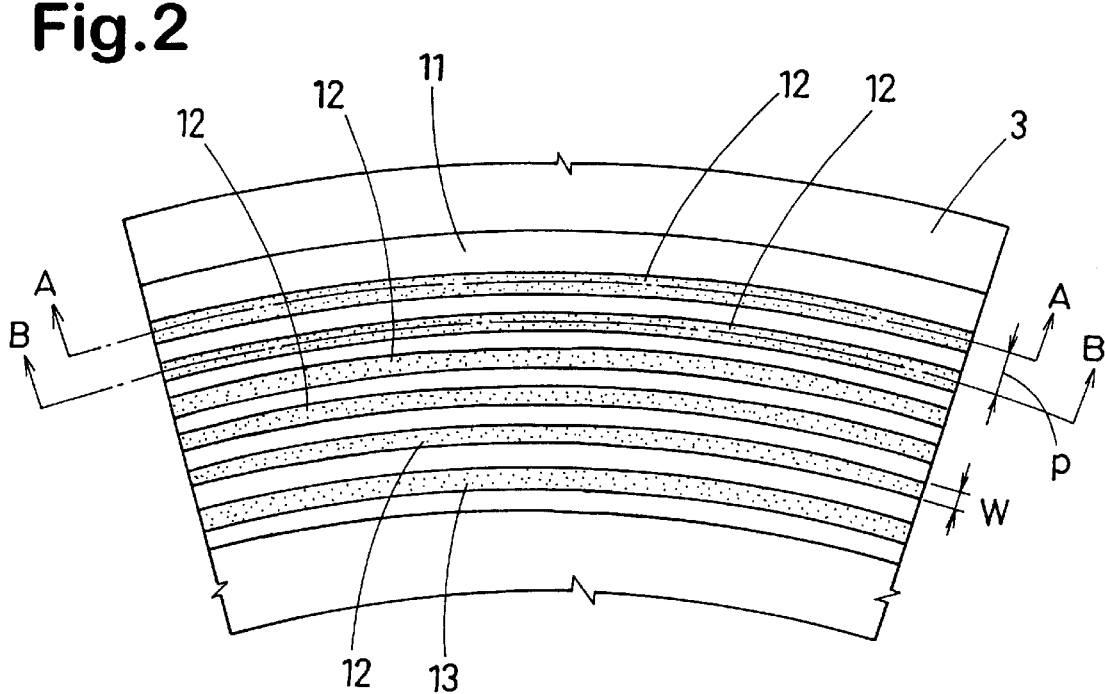
FIG. 2 is a side view of the tire showing an example of the side protector thereof.

In the drawings, pneumatic tire 1 according to the present invention comprises a tread portion, a pair of sidewall portions 3, a pair of bead portions 4 each with a bead core therein, a carcass 6 extending between the bead portions 4, and a belt 7 is posed radially outside the carcass 6 in the tread portion 2.

In this example, the tire 1 is a radial tire designed for use in a vehicle rally.

The carcass 6 comprises at least one, in this example two plies 6A and 6B of cords arranged radially or semi-radially at an angle of from 70 to 90 degrees with respect to the tire equator C, and extending between the bead portions 4 through the tread portion 2 and sidewall portions 3, and turned up around the bead core 5 in each bead portion from the axially inside to the axially outside of the tire so as to form a pair of turned up portions 6b and a main portion 6a therebetween. For the carcass cords, organic fiber cords, e.g. nylon, polyester, aromatic polyamide, aromatic polyester, rayon and the like, carbon fiber cords, steel cords and the like can be used.

Between the turned up portion 6b and main portion 6a in each bead portion 4, there is disposed a bead apex 8 extending radially outwardly from the bead core 5. In this example, the bead portion 4 is not provided with any reinforcing layer. But, it is possible to dispose a reinforcing cord layer if need be.

The belt 7 in this example is composed of two cross plies, a radially inner ply 7A and a radially outer ply 7B, each made of parallel steel cords. Aside from steel cords, organic fiber cords, e.g. aromatic polyamide, aromatic polyester, nylon, polyester, rayon and the like can be used as the belt cords.

According to the present invention, the sidewall portions 3 are each provided on the outer surface 10 with an axially-protruding circumferentially-extending side protector 11.

The side protector 11 comprises at least two concentric ribs and at least one circumferential groove 12 defined therebetween, wherein the circumferential groove 12 is composed of a series of deep parts 12a and shallow parts 12b which alternate in the tire circumferential direction. Thus, the depth of the groove 12 changes cyclically in the tire circumferential direction.

As the number of grooves 12, it is preferable that three or more grooves 12 are provided on each of the side protectors 11, and the grooves 12 (in FIG. 1, six grooves) are disposed substantially equidistantly in the radial direction.

The width W of each groove 12 measured in the radial direction is preferably set in a range of from 0.25 to 4 mm, more preferably from 1 to 3 mm.

The side protector 11 is formed on the radially outside of a position at about one half of the tire section height H. Preferably, as shown in FIG. 1, the side protector 11 is formed to cover from the axial end (B) of a tread rubber to or near the maximum sect n width point of the carcass 6. From a point immediately radially inside the side protector 11 which is, in this example, near the maximum section width point of the carcass 6, the sidewall portion becomes thinnest. This thin part continues radially inwardly to a certain extent which is larger than the width W of he groove 12.

The protrusion height (h) of the side protector 11 which is measured from the thin part on the radially inside of the side protector 11 is preferably set in a range of not less than 2.5 mm, more preferably in a range of from 3 to 4 mm.

The radial extent S of the protector 11 is preferably set in a rang of from 20 to 60%, more preferably from 25 to 40% of the tire section height H.

The pitch length (p) between the grooves 12 measured in the tire radial direction from the groove center to center is preferably set in a range of from 1.0 to 3 times, more preferably 1.5 to 2.5 times the groove width W.

Preferably, the side protector 11 is made of rubber having a hardness of from 60 to 75, and a 100% modulus of from 3900 to 6000 kPa when measured with a durometer type-A according to Japanese Industrial Standard K-6253.

In this example, the side protector 11 is made of the same rubber as a sidewall rubber 15 which is disposed axially outside the carcass in the sidewall portion 3. However, it is also possible to make it from another rubber.

As mentioned above, each groove 12 is changed in depth cyclically in the circumferential direction, and made up of alternate deep parts 12a and shallow parts 12b.

The number of the deep parts 12a (or the shallow parts 12b) per groove is preferably set in a range of from 4 to 20, more preferably from 6 to 16.

The difference (D1−D2) between the maximum depth D1 in the deep parts 12a and the minimum depth D2 in the shallow parts 12b is set in a range of from 0.3 to 3.0 mm, preferably 0.5 to 2.0 mm.

The maximum depth D1 is set in a range of from 0.5 to 8 mm, preferably 3 to 5 mm, and it is less than the protrusion height (h).

As to the cross sectional shape of the groove 12, U-shape, V-shape, semicircle, rectangle, trapezoid and the like can be used. In this example, a U-shaped cross sectional shape is used.

Figure 3A:
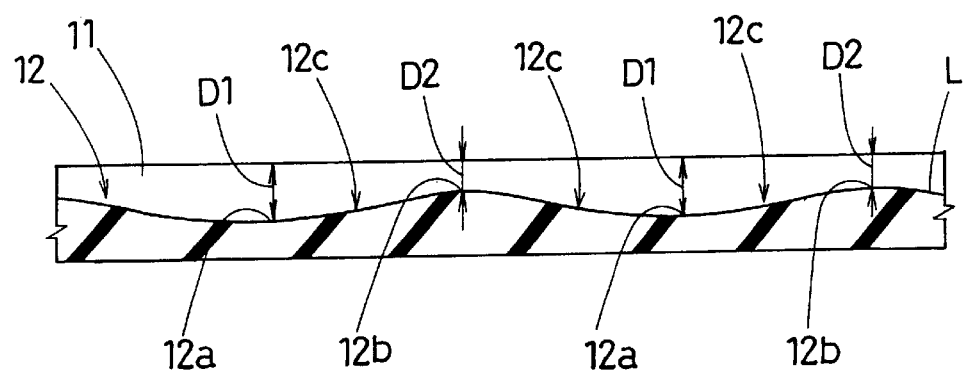
FIGS. 3A and 3B are sectional views taken along a line A—A and a line B—B of FIG. 2, respectively.
Figure 3B:
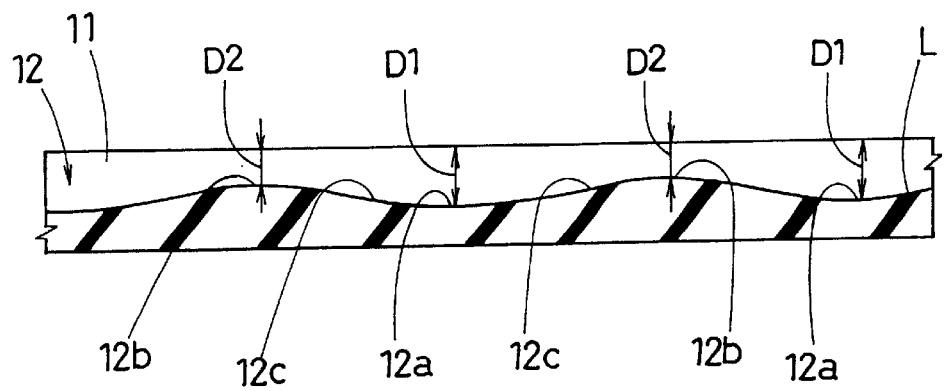

In FIGS. 3A and 3B, the bottom L of the groove 12 is waved like a sine wave. As a result, the groove 12 in this example is made up of variable-depth parts 12c extending between the deepest points and the shallowest points.

Figure 4:
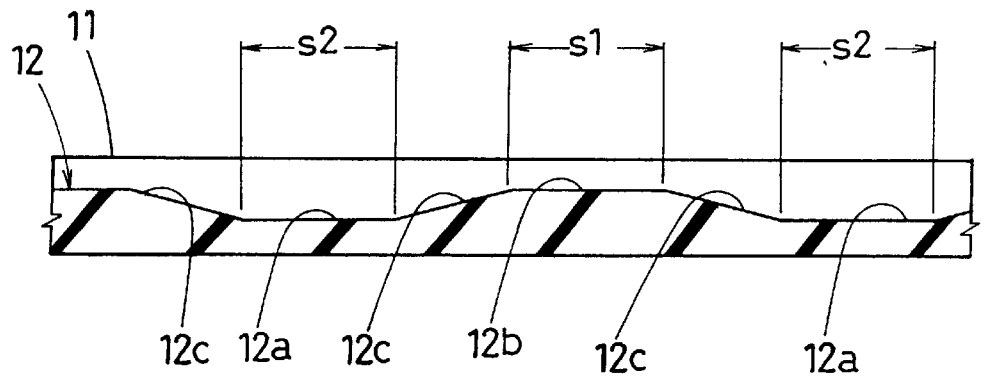
FIGS. 4 and 5 are sectional views each showing a modification of the groove bottom shown in FIG. 3A.
Figure 5:
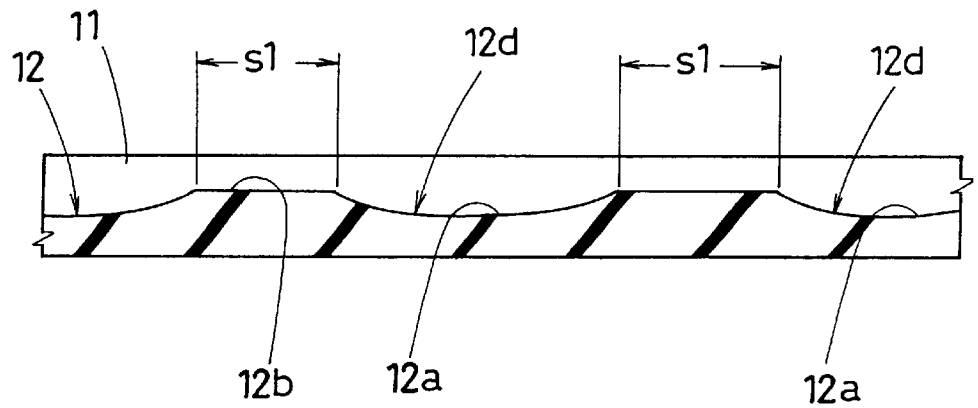
Figure 6:
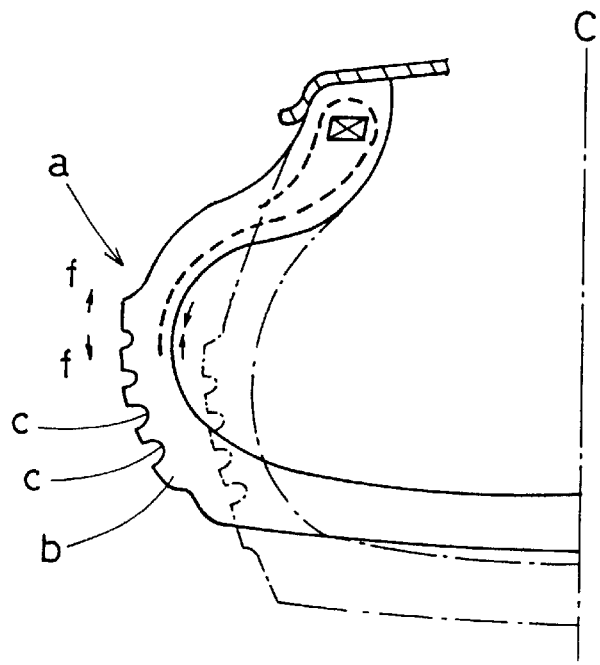
FIG. 6 is a cross sectional view explaining the problems in the prior art.

FIGS. 4 and 5 show modifications of the groove bottom.

In FIG. 4, the maximum depth D1 continues for a certain circumferential length s2 to form the deep part 12a. Also, the minimum depth D2 continues for a certain circumferential length s1 to form the shallow part 12b. The deep parts 12a and shallow parts 12b are linearly bridged by variable-depth parts 12c. Thus, the groove 12 in this example is made up of the constant-depth deep parts 12a, constant-depth shallow parts 12b and variable-depth parts 12c each having a certain length. Preferably, the length s1 is substantially the same as the length s2.

In FIG. 5, the minimum depth D2 continues for a certain circumferential length s2 to form the shallow part 12b. In this example, each part between the adjacent shallow parts 12b is formed by a concave curved part 12d which can be said as a variable-depth part 12c. Thus, the groove 12 in this example is made up of the constant-depth shallow parts 12b and variable-depth parts 12d.

In any case, it is preferable that the phase of the cyclical depth change is circumferentially shifted between the radially adjacent grooves 12 such that, as shown typically in FIGS. 3A and 3B, the deep parts 12a of one groove adjoin the shallow parts 12b of the other groove, and accordingly the shallow parts 12b of one groove adjoin the deep parts 12a of the other groove. In other words, the deep parts 12a and shallow parts 12b are staggered between the radially adjacent grooves 12, whereby the sidewall portion can be improved in the uniformity in the tire circumferential direction and radial direction.

Comparative Tests

Test tires of size 195/65R15 for passenger cars (radial tire for rally) having the structure shown in FIG. 1 and specifications shown in Table 1 were prepared and tested for cut resistance and crack resistance.

Cut Resistance Test: The test tire was provided in the bottom of a groove on the side protector with a circumferential cut having a depth of 1 mm and a length of 1 cm. A test car provided with the test tire was run on a dirt test course, and a runable distance of the tire was measured as cut resistance. In Table 1, the results are indicate in kilometer. The larger the value, the higher the cut resistance. (Wheel rim size: 6JX15, Inner pressure: 240 kPa)

Crack Resistance Test: The test car provided with the test tires was run for 20000 km, and then cracks caused in the groove bottom were measured for size (length×depth). The results are indicate in Table 1, using an index base on the Ref. tire being 100. The smaller the value, the higher the crack resistance.

TABLE 1

| Tire | Ref. | Ex.1 | Ex.2 | Ex.3 | Ex.4 | Ex.5 | Ex.6 | Ex.7 | Ex.8 | Ex.9 |
| --- | --- | --- | --- | --- | --- | --- | --- | --- | --- | --- |
| Side protector | | | | | | | | | | |
| h (mm) | 3.5 | 3.5 | 3.5 | 3.5 | 3.5 | 3.5 | 3.5 | 3.5 | 3.5 | 3.5 |
| S/H | 0.3 | 0.3 | 0.3 | 0.3 | 0.3 | 0.3 | 0.3 | 0.3 | 0.3 | 0.3 |
| Groove | | | | | | | | | | |
| No. of grooves | 6 | 6 | 6 | 6 | 6 | 6 | 6 | 6 | 6 | 6 |
| Bottom | even | FIG. 3 | FIG. 3 | FIG. 3 | FIG. 3 | FIG. 3 | FIG. 3 | FIG. 3 | FIG. 3 | FIG. 3 |
| D1 (mm) | 3 | 3.5 | 3.8 | 4.3 | 3.5 | 3.8 | 4.3 | 3.5 | 3.8 | 4.3 |
| D2 (mm) | 3 | 3 | 2.8 | 2.3 | 3 | 2.8 | 2.3 | 3 | 2.8 | 2.3 |
| D1−D2 (mm) | 0 | 0.5 | 1 | 2 | 0.5 | 1 | 2 | 0.5 | 1 | 2 |
| Deep parts *1 | 0 | 4 | 4 | 4 | 8 | 8 | 8 | 16 | 16 | 16 |
| Tire weight (kg) | 12 | 11 | 11 | 11 | 11 | 11 | 11 | 11 | 11 | 11 |
| Cut resistance | 13 | 13 | 15 | 18 | 13 | 16 | 18 | 14 | 18 | 20 |
| Crack resistance | 100 | 100 | 115 | 138 | 100 | 123 | 138 | 107 | 138 | 153 |

*1) The number of deep parts (or shallow parts) per groove

What is claimed is:

1. A pneumatic tire comprising a pair of sidewall portions each provided on the axially outer surface thereof with a side protector, the side protector comprising at least three concentric ribs and at least two circumferential grooves, each defined between the adjacent two ribs, wherein each said circumferential groove has a bottom which is waved so that the depth thereof varies cyclically in the tire circumferential direction and the circumferential groove is composed of a series of deep parts and shallow parts which alternate in the tire circumferential direction, and the shallow parts connect the adjacent ribs with each other, wherein the variation of the depth is in a range of from 0.5 to 2.0 mm and the maximum depth is in a range of from 3 to 5 mm so that the circumferential grooves are circumferentially continuous.

2. The pneumatic tire according to claim 1, wherein the number of the shallow parts is in a range of from 4 to 20 per groove.

3. The pneumatic tire according to claim 1, wherein the circumferential groove is composed of variable-depth parts having a variable depth and a certain length.

4. The pneumatic tire according to claim 1, wherein the circumferential groove is composed of constant-depth parts having a constant depth and a certain length, and variable-depth parts having a variable depth and a certain length.

5. The pneumatic tire according to claim 4, wherein said constant-depth parts are said deep parts and said shallow parts.

6. The pneumatic tire according to claim 1, wherein the side protector comprising at least two circumferential grooves, and the deep parts and shallow parts are staggered between the radially adjacent grooves.

7. The pneumatic tire according to claim 2, wherein the circumferential groove is composed of variable-depth parts having a variable depth and a certain length.

8. The pneumatic tire according to claim 2, wherein the circumferential groove is composed of constant-depth parts having a constant depth and a certain length, and variable-depth parts having a variable depth and a certain length.

9. The pneumatic tire according to claim 1, wherein the width of each said circumferential groove measured in the tire radial direction is in a range of from 0.25 to 4 mm.

10. The pneumatic tire according to claim 1, wherein said at least two circumferential grooves are at least three circumferential grooves which are disposed substantially equidistantly in the radial direction.

11. The pneumatic tire according to claim 1, wherein said at least two circumferential grooves are at least three circumferential grooves which are disposed substantially equidistantly in the radial direction, said circumferential grooves having a width in a range of from 0.25 to 4 mm in the tire radial direction, and the pitch length between the circumferential grooves measured in the tire radial direction from the groove center to center is in a range of from 1.0 to 3 times the groove width.

12. A pneumatic tire comprising a pair of sidewall portions each provided on the axially outer surface thereof with a side protector made of a rubber having a hardness of from 60–75, and a 100% modulus from 3900 to 6000 KPa, the side protector comprising at least three concentric ribs and at least two circumferential grooves each between the adjacent two ribs, each of said circumferential groove being circumferentially continuous and having a bottom which is waved so that the depth thereof varies to provide the circumferential groove with shallow parts and deep parts therein which alternate in the tire circumferential direction, said shallow parts connecting the adjacent ribs with each other, and the shallow parts are with respect to the shallow parts in the adjacent circumferential groove.

13. The pneumatic tire according to claim 12, wherein the bottom is waved in a substantially sine waveform.

14. The pneumatic tire according to claim 12, wherein the shallow parts having a constant depth and the bottom is provided with deep parts having a constant depth and variable-depth parts between the deep parts and shallow parts.

15. The pneumatic tire according to claim 12, wherein the shallow parts having a constant depth and the bottom is provided with variable-depth parts between the shallow parts.

16. The pneumatic tire according to claim 12, wherein the sidewall protector is made of the same rubber as the sidewall portion.

17. A pneumatic tire comprising:

a pair of sidewall portions, each provided on the axially outer surface thereof with a side protector;

the side protector comprising a plurality of concentric ribs which define circumferential grooves disposed therebetween;

each of said circumferential grooves being circumferentially continuous and having a bottom of variable depth with shallow parts and deep parts which alternate in the tire circumferential direction, said shallow parts connecting the adjacent ribs with each other and having a depth which differs from a line that defines the axial extension of the ribs.

* * * * *